US010853827B2

(12) United States Patent  
Ghosh et al.

(10) Patent No.: US 10,853,827 B2  
(45) Date of Patent: Dec. 1, 2020

(54) DOUBLE-BLIND RESEARCH PORTAL

(71) Applicant: ADP, LLC, Roseland, NJ (US)

(72) Inventors: Debashis Ghosh, Charlotte, NC (US); Kurt D. Newman, Columbus, GA (US); Robert Wohlers, Castro Valley, CA (US)

(73) Assignee: ADP, LLC, Roseland, NJ (US)

( * ) Notice: Subject to any disclaimer, the term of this patent is extended or adjusted under 35 U.S.C. 154(b) by 285 days.

(21) Appl. No.: 16/011,484

(22) Filed: Jun. 18, 2018

(65) Prior Publication Data

US 2019/0385179 A1 Dec. 19, 2019

(51) Int. Cl.
*G06Q 10/00* (2012.01)
*G06Q 30/02* (2012.01)

(52) U.S. Cl.
CPC ..... *G06Q 30/0203* (2013.01); *G06Q 30/0201* (2013.01); *G06Q 30/0205* (2013.01)

(58) Field of Classification Search
None
See application file for complete search history.

(56) References Cited

U.S. PATENT DOCUMENTS

| | | | |
|---|---|---|---|
| 6,778,807 B1 * | 8/2004 | Martino | G09B 7/00 434/307 R |
| 8,482,609 B1 * | 7/2013 | Mishra | H04N 7/181 348/144 |
| 8,744,900 B2 * | 6/2014 | Gross | G06Q 30/0281 705/7.32 |
| 9,870,594 B2 * | 1/2018 | Dildy | G06Q 30/0201 |
| 2003/0083932 A1 * | 5/2003 | Wolf | G06Q 30/0277 705/14.66 |
| 2003/0195793 A1 * | 10/2003 | Jain | G06Q 30/02 705/7.32 |
| 2008/0243539 A1 * | 10/2008 | Barish | G16H 30/40 705/2 |
| 2009/0241177 A1 * | 9/2009 | Bluth | A61B 5/14546 726/7 |

(Continued)

OTHER PUBLICATIONS

Junghans, Cornelia, Recruiting patients to medical research: double blind randomised trial of "opt-in" versus "opt-out" strategies, https://doi.org/10.1136/bmj.38583.625613.AE, p. 1-12.*

(Continued)

*Primary Examiner* — Joseph M Waesco
(74) *Attorney, Agent, or Firm* — Yee & Associates, P.C.

(57) ABSTRACT

A computer-implemented method, system, and computer program product for research in a double-blind framework, links, by a data processing system, a double-blind framework application to an intra-network database, provides a double-blind framework portal linked to the double-blind framework application, and responsive to a request entered on the double-blind framework portal, provides to a requestor, responses to research surveys directed to an audience selected from the intra-network database based on an intra-change system. The intra-network database comprises a database of entities and employees of the entities that have opted-in to an intra-change system. The intra-change system provides financial incentives to the entities and employees by sharing a fee paid by the requestor for each research survey.

20 Claims, 10 Drawing Sheets

(56) References Cited

U.S. PATENT DOCUMENTS

| | | | |
|---|---|---|---|
| 2013/0041835 A1* | 2/2013 | Thompson | G06Q 40/04 |
| | | | 705/322 |
| 2015/0154527 A1* | 6/2015 | Gill | G06Q 10/06395 |
| | | | 705/7.41 |
| 2016/0034918 A1* | 2/2016 | Bjelajac | G06Q 30/0201 |
| | | | 705/7.32 |
| 2016/0034930 A1* | 2/2016 | Verschoor | G06Q 30/0282 |
| | | | 705/7.32 |
| 2016/0189195 A1* | 6/2016 | Ryan | G06Q 20/10 |
| | | | 705/14.27 |
| 2016/0328743 A1* | 11/2016 | Militi | G06Q 30/0255 |
| 2017/0229030 A1* | 8/2017 | Aguayo, Jr. | G09B 5/065 |
| 2017/0319083 A1* | 11/2017 | Bluth | G06Q 50/22 |
| 2017/0324744 A1* | 11/2017 | Rinzler | G06N 5/04 |
| 2018/0189691 A1* | 7/2018 | Oehrle | G06Q 10/063 |
| 2018/0218078 A1* | 8/2018 | Rinzler | G06Q 20/29 |
| 2018/0374158 A1* | 12/2018 | Schnelzer | G06Q 40/10 |
| 2019/0066011 A1* | 2/2019 | Portnoy | G06Q 10/06312 |

OTHER PUBLICATIONS

Stevens, "Employee Research—a Neglected Treasure Trove of Market Intelligence," B2B International, 2018, 9 pages.

* cited by examiner

ADP® CONSUMER INSIGHTS Home  My Project  Create New Project  Analytical Platform  Jane Doe ▼

Define your audience ~512  514~ $1,450  March 19 ~516
Powered by ADP Data  Estimated Cost (USD)  Estimated Delivery  [ Next ] ~518

EMPLOYMENT

> Industry: Any ~622
> Company Size: 100 - 500 employees ~624
> Job Level: Any ~626  }~620
> Employment Status: Any ~628
> Time in current position: Any ~630

FINANCIAL & ASSET

> Wage Trends: Increased +20% over the past 3 years ~642
∨ Estimated Monthly Disposable Income:
   5k    10k
   |—○———○—|  ~644
> Homeownership: Owner ~646
∨ Home Value (for home owners): ~648
   ○ Any
   ⊙ Slider bar
   100k   250k
   |—○———○—|

}~640

502
510
511

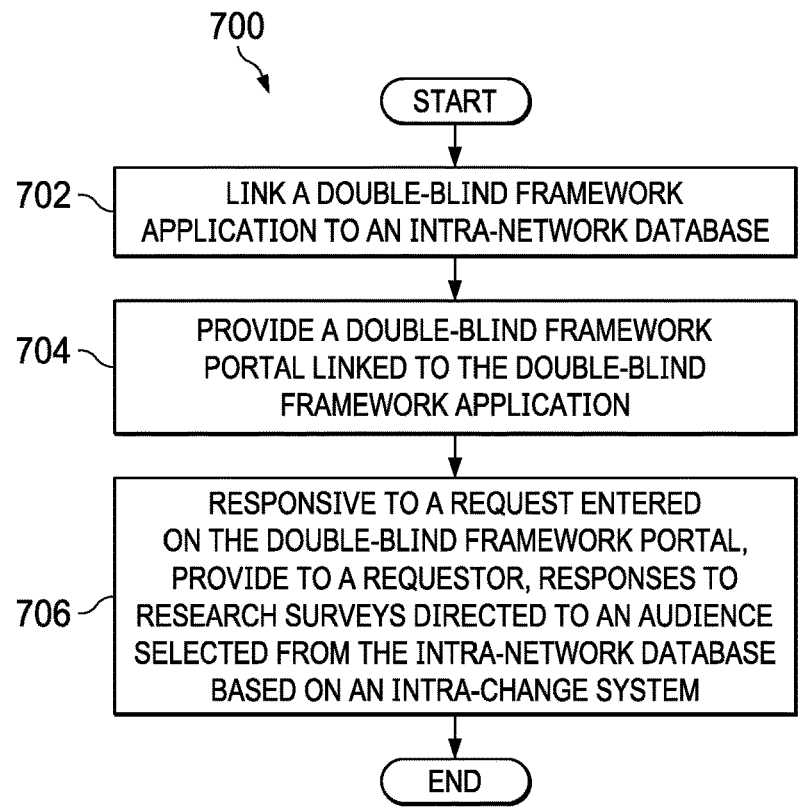
FIG. 7
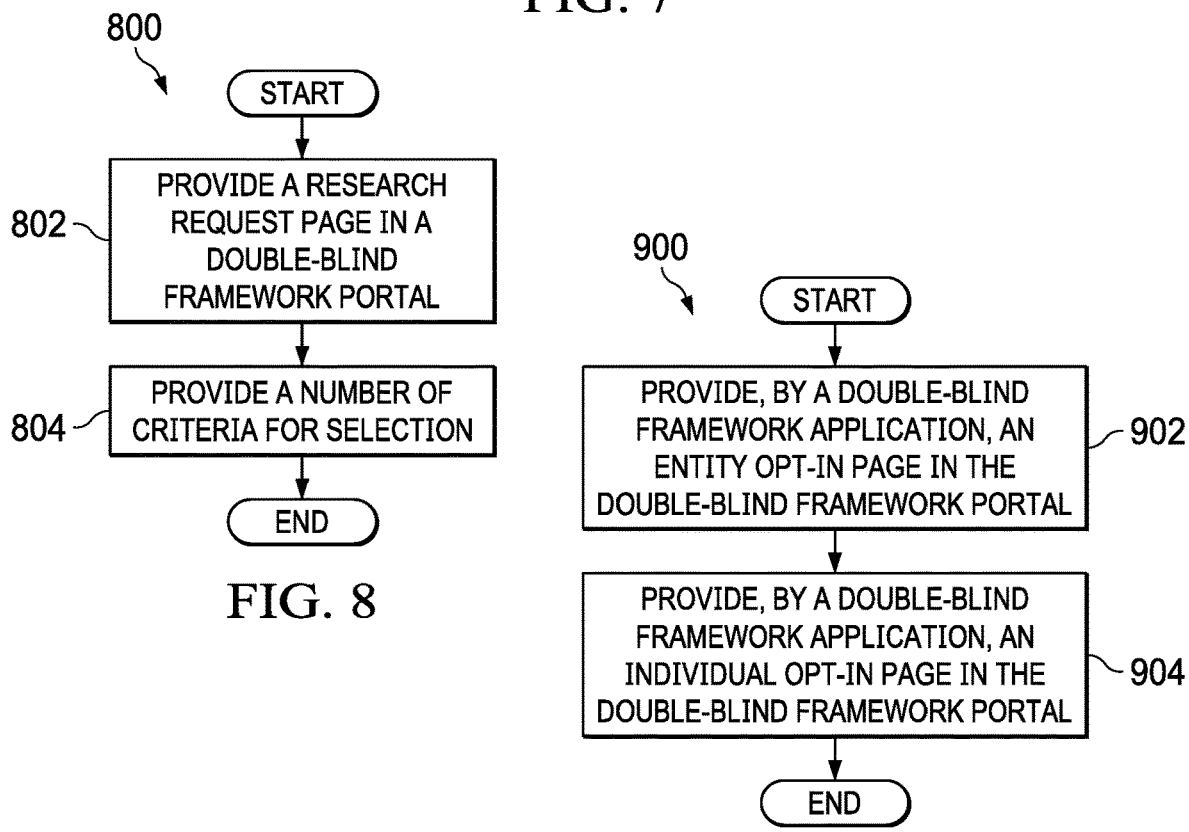
FIG. 8
FIG. 9

DOUBLE-BLIND RESEARCH PORTAL

BACKGROUND INFORMATION

1. Field

The present disclosure relates generally to an improved computer system and, in particular, to a method and apparatus for research. Still more particularly, the present disclosure relates to a method and apparatus for research by conducting surveys in a double-blind framework application linked to an intra-network database to deliver survey results in a reduced time and with a reduced amount of resources.

2. Background

The research industry faces a number of challenges. For example, market research is conducted by sending market surveys to individuals. The market surveys ask a number of preliminary questions to identify the background of the respondent. A survey may ask for age, gender, salary, geographic location, employment, and industry of employment. There is no current method to validate survey results as to the honesty of the responses including the base questions regarding age, gender, salary, geographic location, employment, and industry. Moreover, the responses that are received may be incomplete.

The current method of dealing with these issues is to create large sample groups. The large size of the sample groups requires more time to send, receive, and compile results. In addition, the large sample groups increase the costs of the market survey. The increased costs may place research surveys beyond the budget of small companies giving the larger companies an advantage in the marketplace. Furthermore, the small companies may find necessary expertise in the area of market surveys beyond the company budget.

Generational changes and social media mean that markets change or shift much more rapidly than current legacy systems and methods can deal with. The time required to complete end-to-end research may result in events in the marketplace overtaking the research so that the results are obtained too late to capture an emerging trend or to avoid a demographic shift.

Therefore, it would be desirable to have a method and apparatus that take into account at least some of the issues discussed above, as well as other possible issues. For example, it would be desirable to have a method and apparatus that would provide research rapidly from validated entities and validated individuals through a double-blind research portal to deliver survey results in a reduced time and with a reduced amount of resources.

SUMMARY

An embodiment of the present disclosure provides a computer-implemented method for conducting research by survey in a double-blind framework, the computer-implemented method comprising: linking, by a data processing system, a double-blind framework application to an intra-network database; providing, by the data processing system, a double-blind framework portal linked to the double-blind framework application; responsive to a request entered on the double-blind framework portal, providing to a requestor, by the data processing system, responses to research surveys directed to an audience selected from the intra-network database based on an intra-change system; wherein the intra-network database comprises a database of entities and employees of the entities that have opted-in to an intra-change system; wherein the intra-change system provides financial incentives to the entities and employees by sharing a fee paid by the requestor for each research survey.

Another embodiment of the present disclosure provides a system for conducting research by survey in a double-blind framework, the system comprising: a data processing system connected to a network and an intra-network database; a double-blind framework application stored on a computer-readable medium and configured to cause a processor unit of the data processing system to link a double-blind framework application to an intra-network database, to provide, a double-blind framework portal linked to the double-blind framework application, responsive to a request entered on the double-blind framework portal, to provide to a requestor responses to research surveys directed to an audience selected from the intra-network database based on an intra-change system; wherein the intra-network database comprises a database of entities and employees of the entities that have opted-in to an intra-change system; wherein the intra-change system provides financial incentives to the entities and employees by sharing a fee paid by the requestor for each research survey.

Yet another embodiment of the present disclosure provides a computer program product for conducting research by survey in a double-blind framework, the computer program product comprising: computer program instructions stored in a computer-readable storage medium and configured to cause a processor unit to link a double-blind framework application to an intra-network database; computer program instructions stored in a computer-readable storage medium and configured to cause a processor unit to provide a double-blind framework portal linked to the double-blind framework application; computer program instructions stored in a computer-readable storage medium and configured to cause a processor unit, responsive to a request entered on the double-blind framework portal, to provide to a requestor responses to research surveys directed to an audience selected from the intra-network database based on an intra-change system; wherein the intra-network database comprises a database of entities and employees of the entities that have opted-in to an intra-change system; wherein the intra-change system provides financial incentives to the entities and employees by sharing a fee paid by the requestor for each research survey.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a double-blind framework application portal in accordance with an illustrative embodiment;

FIG. 6 is an illustration of a double-blind framework application portal in accordance with an illustrative embodiment;

FIG. 7 is an illustration of a flowchart of providing research using a double-blind framework in accordance with an illustrative embodiment;

FIG. 8 is a flowchart of a process for receiving criteria in accordance with an illustrative embodiment;

FIG. 9 is a flowchart of a process for providing entity and individual opt-in to the double-blind framework in accordance with an illustrative embodiment;

DETAILED DESCRIPTION

Figure 1:
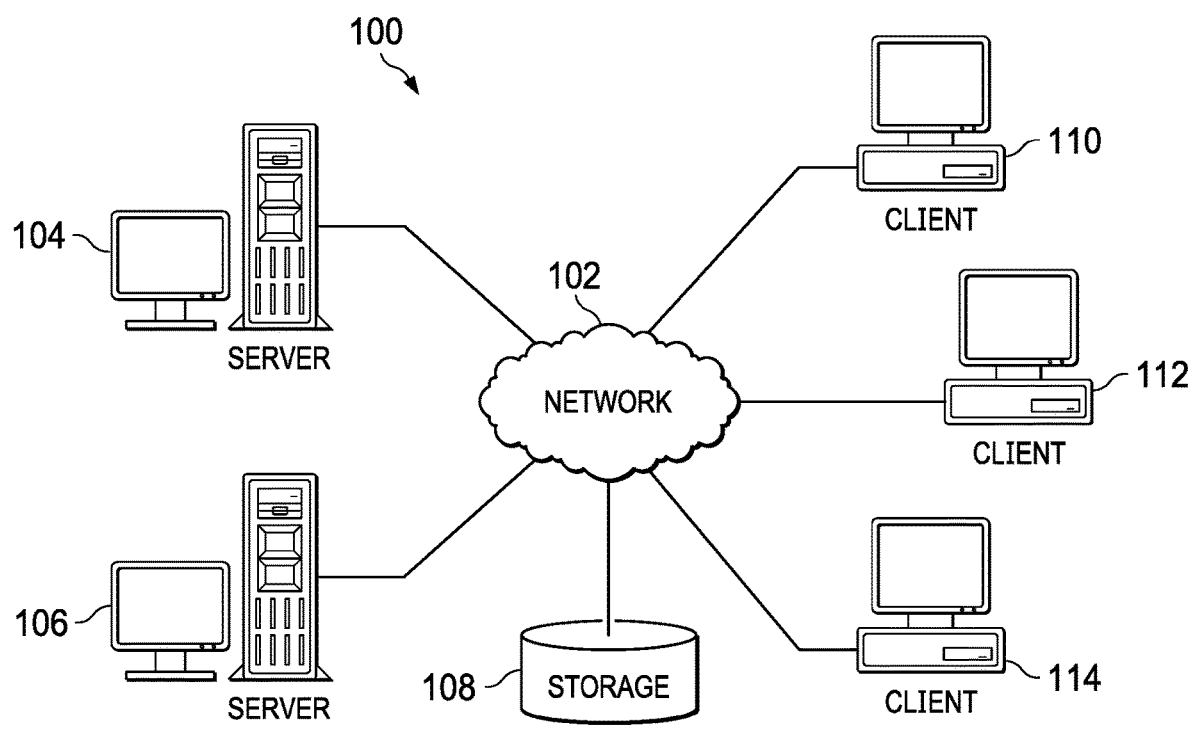
FIG. 1 is a block diagram of an information environment in accordance with an illustrative embodiment.

The illustrative embodiments recognize and take into account one or more different considerations. Persons skilled in the art recognize and take into account that it would be advantageous to achieve rapid response time in obtaining survey results. In an illustrative example, research surveys may be designed for rapid launch to get decision-quality results in substantially reduced time. In an illustrative example, substantially reduced time would be at least 50% less time than current methods of performing research using surveys. In an illustrative example, one method of reducing time would be to employ pre-populated research surveys. Pre-populated research surveys may be possible using a known validated database in order to identify individuals who meet such criteria as age, gender, geographic location, and income level.

As used herein, "pre-populated" means to provide a research survey in which answers to the basic questions are already known and therefore do not have to be presented to the individual or entity responding to the research survey. Persons skilled in the art recognize and take into account that a payroll database has a large number of individuals who may be pre-populated for research. Persons skilled in the art recognize and take into account that such surveys may be used for political polling. Persons skilled in the art recognize and take into account that using employees from a payroll database allows validation of pre-populated information. Persons skilled in the art recognize and take into account that validated responses, speed, and a quantity of information provide decision-quality survey results.

Persons skilled in the art recognize and take into account that it would be advantageous to obtain answers to research survey questions where the requestor of the research survey does not know which individuals or what entities are answering the survey questions and the individuals or entities answering the survey questions do not know who is requesting the information.

Persons skilled in the art recognize and take into account that greater accuracy in answers may be obtained with incentivized participants. In an illustrative example, an individual who receives compensation for answering a survey is motivated to be asked to respond to further surveys for which compensation will be paid. In an illustrative example, survey results can be analyzed to determine if there is a probability of false answers. If a threshold probability is reached that an individual is providing false answers, then the individual may be excluded from the pool of pre-populated respondents.

Persons skilled in the art recognize and take into account that use of payroll databases for pre-populated research democratizes research allowing small business to obtain data similar to the type of data provided to large companies.

Persons skilled in the art recognize and take into account that it would advantageous to have a single comprehensive portal for survey design and audience selection. In an illustrative example, a company may want to test consumer response to a new product. The company may want to target a certain gender, age, or demographic group. The company may want to employ a number of research channels such as focus groups in a number of metropolitan areas. Persons skilled in the art recognize and take into account that it would advantageous to leverage a database of employers and employees to create a large, national, demographically-reliable, "double-blind" consumer research panel.

As used herein, "double-blind" means that a requestor who has requested a research survey using the double-blind research framework shall not be known to the person or entity providing a response to a survey, and the person or entity providing the response to the survey will not know the entity or person whose request caused the survey to be sent to the individual or entity.

As used herein, "intra-network database" shall mean a database of employers and employees where the employers have opted-in to a double-blind research framework and have a payroll service provided by the payroll company having the double-blind research framework, and the employees of the opted-in employers have individually opted-in to the double-blind research framework.

As used herein, "pre-populated data" shall mean data that is known and validated because the employer or employees that have opted-in to the double-blind research framework have authorized use of their payroll data and other data for use in the double-blind research framework.

As used herein, "intra-change system" shall mean a system where employers and employees are financially incentivized to opt-in to the service by sharing a fee paid by researchers for each completed survey.

As used herein, "research" shall mean research conducted by electronic delivery of surveys and may comprise market research.

Persons skilled in the art recognize and take into account that a single portal may provide a person or entity needing research to obtain rapid research results that are validated, timely, and granular. In an illustrative example, the portal may provide for registration, survey design, tracking, payment, and output.

The current method of dealing with these issues is to create large sample groups. The large size of the sample groups requires more time to send, receive, and compile results. In addition, the large sample groups increase the costs of the survey. The increased costs may place research surveys beyond the budget of small companies giving the larger companies an advantage in the marketplace. Furthermore, the small companies may find necessary expertise in the area of surveys beyond the company budget.

Research by survey in a double-blind framework may be enabled by linking a double-blind framework application to an intra-network database, providing a double-blind framework portal linked to the double-blind framework application, and responsive to a request entered on the double-blind framework portal, providing, to a requestor, responses to research surveys directed to an audience selected from the intra-network database based on an intra-change system. The intra-network database may comprise a database of entities and employees of the entities that have opted-in to the intra-change system. The intra-change system may provide financial incentives to the entities and employees by sharing a fee paid by the requestor for each research survey. Thus, one or more technical solutions may provide a technical effect by providing pre-populated and validated data for survey respondents, therefore reducing time to provide results to requestors, and incentivizing the respondents to provide truthful responses. The pre-populated and validated data is enabled by using employers with payroll databases and employees in the payroll databases.

In an illustrative example, a company having a number of employees with a payroll will have accurate data regarding each individual employee to ensure accuracy of withholding and payment information. Moreover, accurate contact information is available for each employee, so that each employee can be contacted and offered an opportunity to opt-in to a double-blind research framework. Furthermore, entities, such as sole-proprietorships, partnerships, limited liability companies, and corporations who opt-in to the double-blind framework may send research surveys to other entities. In the illustrative example, the double-blind framework is offered by a company that provides payroll services to the other entities. In this way, the company that provides the double-blind framework for research may provide validated and pre-populated data, scalable and precise targeting of particular criteria, and rapid responses. Furthermore, all research may be provided at a single portal from a single entity.

Thus, in one illustrative embodiment, one or more technical solutions are present that overcome a technical problem in the area of conducting research by survey because the illustrative embodiment is faster than current systems and methods, and thereby saves time and reduces resources necessary to send surveys and to obtain accurate results.

As used herein, "resources" shall mean one or more of the following: the amount of time to deliver a survey to a participant, the amount of time to populate survey data, the amount of time to validate survey data, the amount of time to receive and tabulate results, the amount of time to analyze results, the amount of time to deliver results to a client, the amount of processor time and internet bandwidth to deliver the survey and receive survey data, the amount of processor time to execute instructions for the double-blind framework application, the amount of memory and storage required for preparation and delivery of the survey, and the amount of memory and storage to store results of the survey. Reduction in processor time may be a reduction in an amount of time that processor unit 1604 in FIG. 16 spends executing instructions for one or more functional components of double-blind framework application 230 in FIG. 2 and for executing instructions for the processes set forth in FIG. 7 through FIG. 15 compared to current computerized survey systems. Reduction in memory and storage may be a reduction in an amount of memory and storage in memory 1606 and persistent storage 1604 in FIG. 16 compared to current computerized survey systems. Moreover, reductions in storage may be reductions in program code 1624, computer-readable storage media 1626, and computer-readable signal media 1628 in FIG. 16.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category. In the illustrative examples, the same reference numeral may be used in more than one figure. This reuse of a reference numeral in different figures represents the same element in the different figures.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, programmable apparatus or other device to produce a computer-implemented process, such that the instructions which execute on the computer, programmable apparatus, or other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
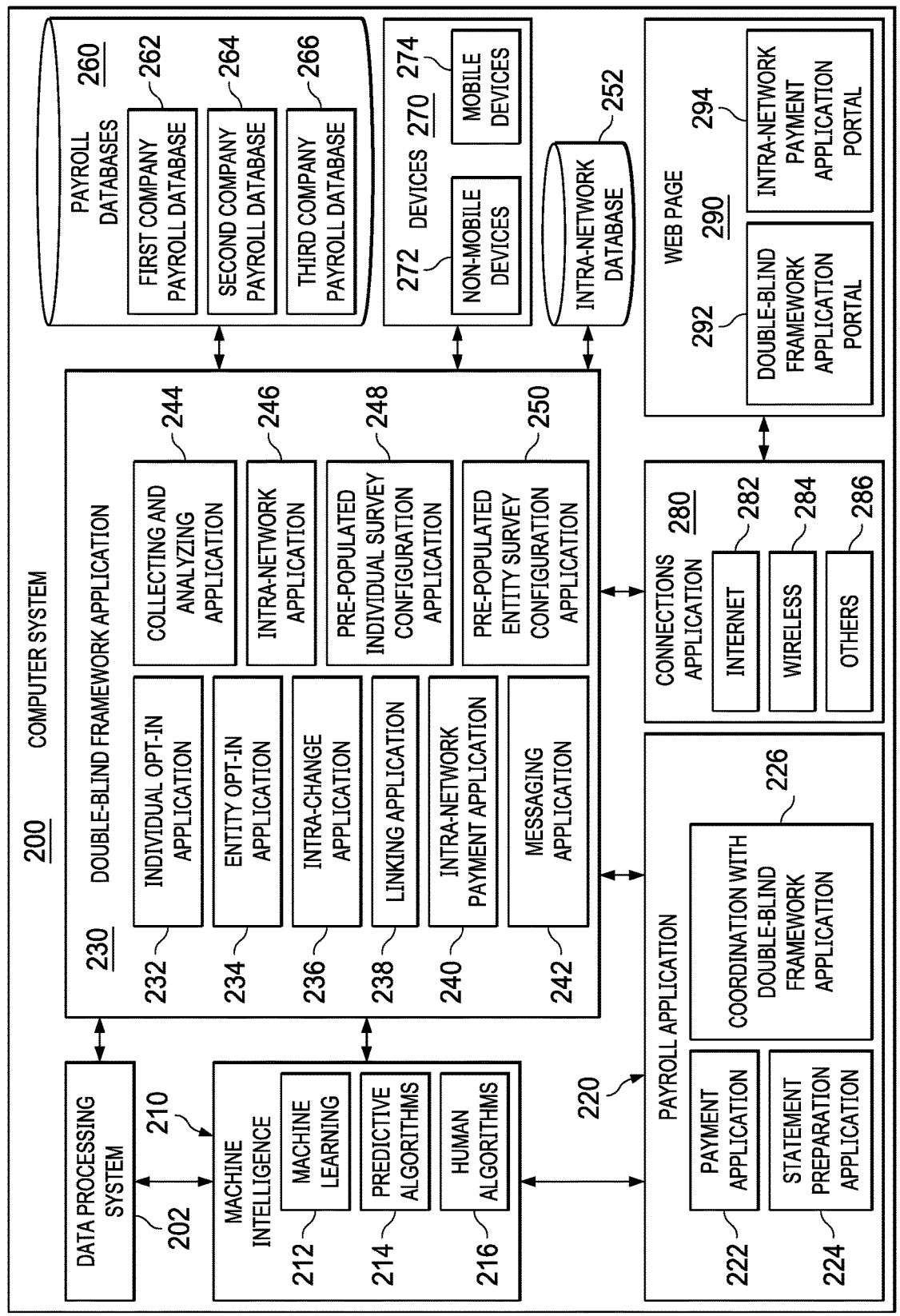
FIG. 2 is a block diagram of a computer system for providing a double-blind framework application, a double-blind framework application portal, an intra-change system, and an intra-network payment application portal in accordance with an illustrative embodiment.

Turning to FIG. 2, a block diagram of a computer system for providing a double-blind framework application, a double-blind framework application portal, an intra-change system, and an intra-network payment application portal is depicted in accordance with an illustrative embodiment. Computer system 200 comprises data processing system 202. Data processing system 202 may be data processing system 1600 in FIG. 16. Computer system 200 may use one or more programs such as machine intelligence 210, payroll application 220, double-blind framework application 230, connections application 280, and web page 290 in order to provide research by survey in a double-blind framework by running on a processor unit such as processor unit 1604 in data processing system 1600 in FIG. 16.

Machine intelligence 210 comprises machine learning 212, predictive algorithms 214, and human algorithms 216. Machine intelligence 210 can be implemented using one or more systems such as an artificial intelligence system, a neural network, a Bayesian network, an expert system, a fuzzy logic system, a genetic algorithm, or other suitable types of systems. Machine intelligence 210 may analyze survey results to determine if there is a probability of false answers. If a threshold probability is reached that an individual is providing false answers, then the individual may be excluded from the pool of pre-populated respondents. Moreover, machine intelligence 210 can be used to analyze and make recommendations to a requestor as to ways to better prepare research survey questions as well as other ways to reduce the time to obtain results and apply the results.

Payroll application 220 provides payroll services to a number of companies. Payroll application 220 comprises a number of applications including, without limitation, payment application 222, statement preparation application 224, and coordination with double-blind framework application 226. Payroll application 220 operates by accessing payroll databases 260 by means of data processing system 202. Payroll databases 260 may comprise first company payroll database 262, second company payroll database 264, and third company payroll database 266. Persons skilled in the art recognize and take into account that any number of companies may have payroll databases residing in payroll databases 260, and that first company payroll database 262, second company payroll database 264, and third company payroll database 266 are presented by way of illustrative example and not by way of limitation.

Double-blind framework application 230 may comprise a number of applications including, without limitation, individual opt-in application 232, entity opt-in application 234, intra-change application 236, linking application 238, intra-network payment application 240, messaging application 242, collecting and analyzing application 244, intra-network application 246, pre-populated individual survey configuration application 248, and pre-populated entity survey configuration application 250.

Figure 10:
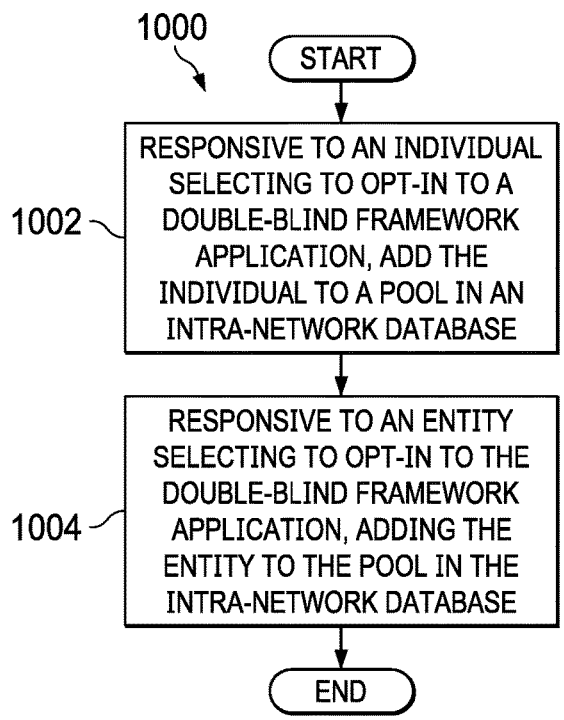
FIG. 10 is a flowchart of a process for adding an entity to a pool in an intra-network database in accordance with an illustrative embodiment.

Individual opt-in application 232 comprises instructions to enable step 1002 of process 1000 in FIG. 10 so that individual employees may opt-in to the double-blind framework application. Opting-in allows the individual employees to respond to research surveys. Entity opt-in application 234 comprises instructions to enable step 1004 of process 1000 in FIG. 10 so that entities may opt-in to the double-blind framework application. Individual opt-in application 232 and entity opt-in application 234 may use double-blind framework application portal 292 in web page 290.

Intra-change application 236 comprises instructions to data processing system 202 to enable employers and employees to receive financial incentives to opt-in to the service by sharing a fee paid by researchers for each completed survey. Intra-change application 236 may interact with linking application 238 to form an intra-change system of opted-in entities and employees.

Intra-network payment application 240 comprises instructions to cause data processing system 202 to deliver payment amounts to entities and employees who opted-in to double-blind framework application 230 and that have completed research surveys. Messaging application 242 comprises instructions to cause data processing system 202 to send research surveys and to receive responses to research surveys. Messaging application 242 further comprises instructions to cause data processing system 202 to send a summary of survey results and the research survey response to a requestor. Collecting and analyzing application 244 comprises instructions to cause data processing system 202 to receive responses to research surveys sent to opted-in entities and employees, and to summarize the results and prepare a summary along with the attached research surveys for delivery to a requestor by messaging application 242.

Intra-network application 246 comprises instructions to data processing system 202 to populate intra-network database 252 with employers and employees that have opted-in to double-blind framework 230 and have a payroll service provided by the payroll company having the double-blind research framework of double-blind framework application 230, and where a number of employees of the opted-in employers have individually opted-in to the double-blind framework application 230.

Pre-populated individual survey configuration application 248 comprises instructions to data processing system 202 to select individuals to receive individual research surveys, to configure the individual research surveys in accordance with requestor criteria, and to distribute the individual research surveys using messaging application 242. Pre-populated entity survey configuration application 250 comprises instructions to data processing system 202 to select entities to receive entity research surveys, to configure the entity research surveys in accordance with requestor criteria, and to distribute the entity research surveys using messaging application 242.

Connections application 280 comprises instructions to data processing system 202 to provide connectivity between data processing system 202, machine intelligence 210, payroll application 220, double-blind framework application 230, web page 290, intra-network database 252, payroll databases 260, and devices 270. Connections may be Internet 282, wireless 284 or others 286. Devices 270 may comprise non-mobile devices 272 and mobile devices 274. Web page 290 comprises double-blind framework application portal 292 and intra-network payment application portal 294.

As a result, computer system 200 operates as a special purpose computer system for providing pre-populated and validated data for survey respondents, reducing time to provide results to requestors, reducing resources to sending surveys and receiving survey results, and incentivizing the respondents to provide truthful responses. Thus, double-blind framework application 230 makes computer system 200 a special purpose computer system as compared to currently available general computer systems that do not have a means to perform the functions of computer system 200 of FIG. 2 described herein and as further described in FIGS. 3-16.

Moreover, currently used general computer systems do not provide a data processing system such as data processing system 216 configured by the processes in FIGS. 3-16. Moreover, currently used general computer systems do not provide rapid survey response from validated entities or employers in conjunction with an intra-network payment system.

Figure 3:
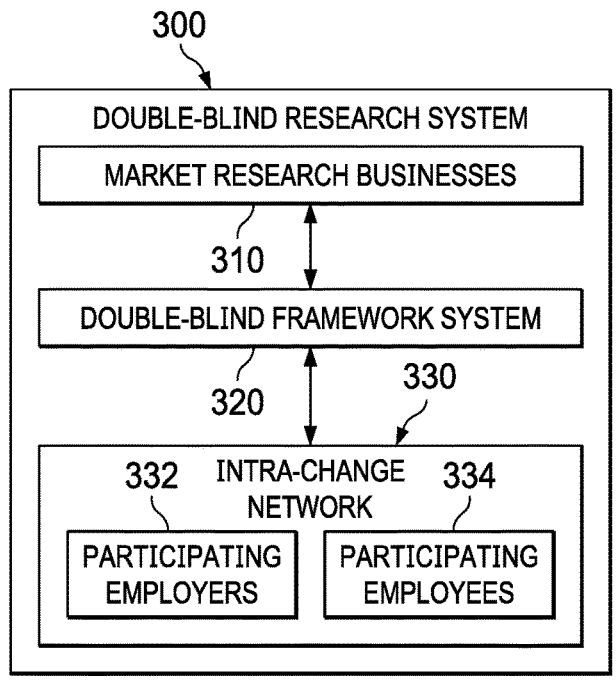
FIG. 3 is a block diagram of a double-blind research system in accordance with an illustrative embodiment.

Turning to FIG. 3, a block diagram of a double-blind research system is depicted in accordance with an illustrative embodiment. Double-blind research system 300 comprises market research businesses 310, double-blind framework system 320, and intra-change network 330. Intra-change network 330 comprises participating employers 332 and participating employees 334. In an embodiment, market research businesses 310 may comprise one or more businesses conducting other types of research than marketing research. Double-blind research system 300 may be computer system 200 in FIG. 2. Intra-change network 330 may comprise intra-network application 246 and intra-network database 252 in FIG. 2.

Figure 4:
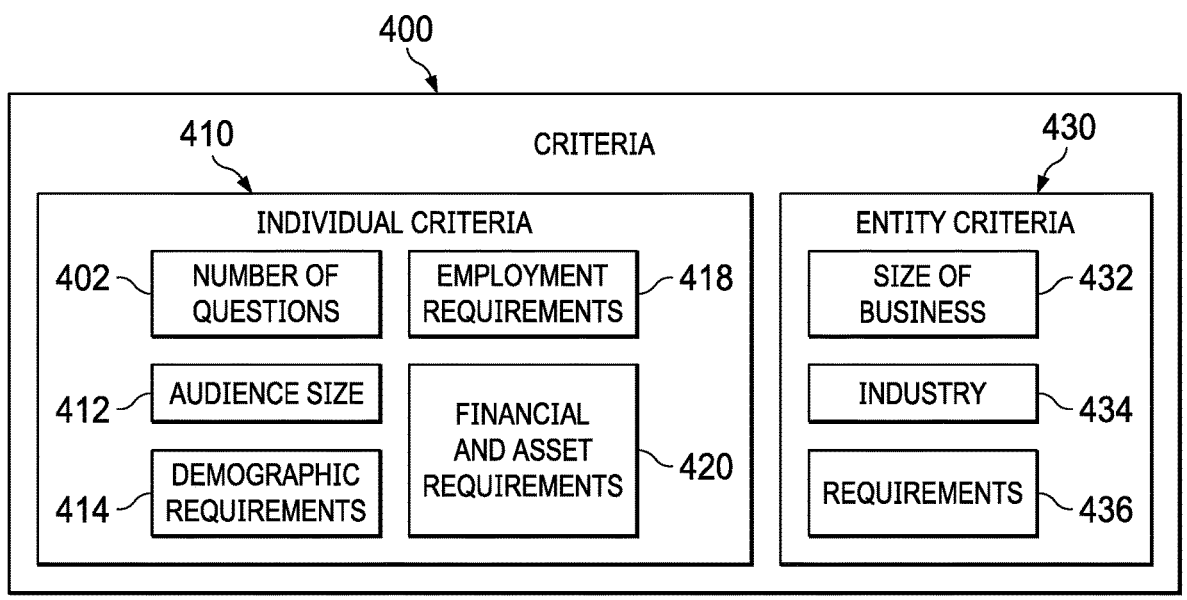
FIG. 4 is a block diagram of criteria for the double-blind framework in accordance with an illustrative embodiment.

Turning to FIG. 4, a block diagram of criteria for a double-blind research framework such as double-blind framework application 230 in FIG. 2 and double-blind research system 300 in FIG. 3 is depicted in accordance with an illustrative embodiment. Criteria 400 may comprise individual criteria 410 and entity criteria 430. Individual criteria 410 may comprise number of questions 402, audience size 412, demographic requirements 414, employment requirements 418, and financial and asset requirements 420. Entity criteria 430 comprise size of business 432, industry 434, and requirements 436.

Figure 5:
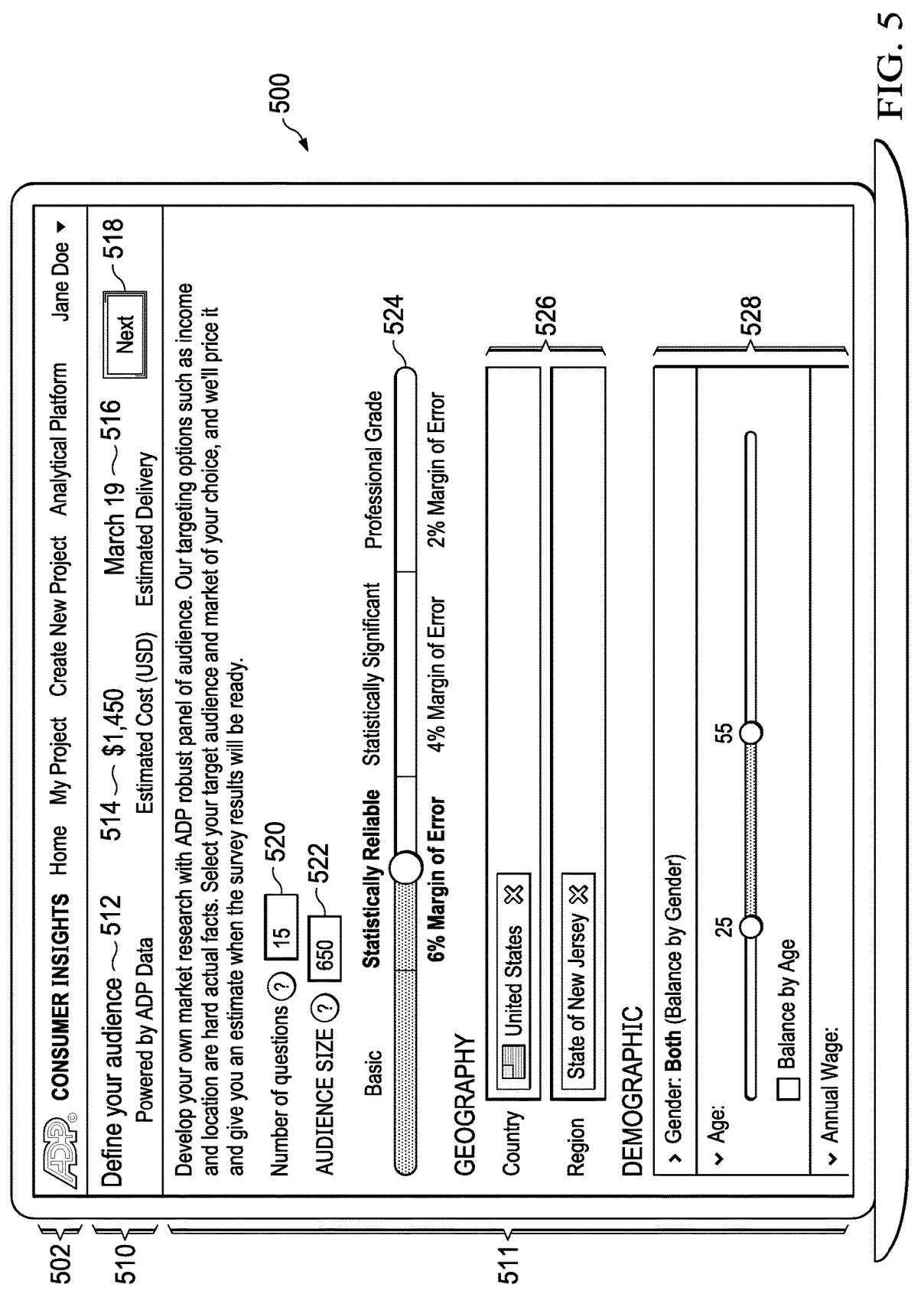

Turning to FIG. 5, an illustration of a double-blind framework application portal is depicted in accordance with an illustrative embodiment. Double-blind framework application portal 500 may be double-blind framework application portal 292 in web page 290 in FIG. 2. Double-blind framework application portal 500 may be used by a requestor to select criteria such as one or more of criteria 400 in FIG. 4 in order to order a survey. Double-blind framework application portal 500 may comprise three regions. First region 502 may provide information and selection for additional pages such as "Home," "My Project," "Create New Project," and "Analytical Platform." Second region 510 displays page heading "Define your audience" 512, "Estimated Cost (USD)" window 514, "Estimated Delivery" window 516, and "Next" button 518 to allow movement to another page view. "Estimated Cost (USD)" window 514 may display a fee for a research survey project based on criteria identified in double-blind framework application portal 500 and double-blind framework application portal 600 in FIG. 6. "Estimated Delivery" 516 may comprise a completion date for a requestor's project. In an illustrative example, completion for the requestor's project would provide a summary of the research surveys and each individual pre-populated research survey response. Third region 511 provides questions for a requestor to configure a requested survey. The requestor may identify a number of questions to be provided in "Number of questions" window 520. In the illustrative example, "15" has been selected in "Number of questions" window 520 so that a size of a survey would comprise 15 questions. The number of research surveys to be sent may be identified in "audience size" 522. In the illustrative example, the audience size has been designated as 650. A sliding scale, such as sliding scale 524, may be provided for the requestor to select a margin of error. A country and region of the country may be selected in "geography" selection 526. Demographic selections may be provided by interaction with "demographic" section 528. In the illustrative example, selections include gender, age, and annual wage. Double-blind framework application portal 500 may enable process 700 in FIG. 7 and process 800 in FIG. 8.

Turning to FIG. 6, an illustration of a double-blind framework application portal is depicted in accordance with an illustrative embodiment. Double-blind framework application portal 600 may be double-blind framework application portal 292 in web page 290 in FIG. 2. Double-blind framework application portal 600 may be a second page of double-blind framework application portal 500 in FIG. 5 shown either by scrolling down third region 511 of double-blind framework application portal 500 or by activating "Next" button 518 of double-blind framework application portal 500 in FIG. 5. Double-blind framework application portal 600 displays first region 502, second region 510, and fourth region 614. First region 502 and second region 510 are the same as shown in FIG. 5. Fourth region 614 displays further criteria selections in employment area 620 and financial and asset area 640. In the illustrative example, employment area 620 displays windows for a requestor to select "Industry" 622, "Company Size" 624, "Job Level" 626, "Employment Status" 628, and "Time in current position" 630. In the illustrative example, a requestor designated 100-500 employees for "Company Size" 624, and "any" for each of industry 622, "Job Level" 626, "Employment Status" 628, and "Time in current position" 630. In the illustrative example, "financial and asset" area 640 displays windows for "Wage Trends" 642, "Estimated Monthly Disposable Income" 644, "Homeownership" 646, and "Home Value (for home owners)" 648. In the illustrative example, the requestor entered "Increased +20% over the past 3 years" for "Wage Trends" 642, a range of "5 k-10 k" for "Estimated Monthly Disposable Income 644, "Owner" for "Homeownership" 646, and "100 k-250 k" for "Home Value (for home owners)" 648. The criteria entered by the requestor are provided by way of example and not by way of limitation. Double-blind framework application portal 600 may enable process 700 in FIG. 7 and process 800 in FIG. 8.

Turning to FIG. 7, a flowchart of process for a computer-implemented method for conducting research by survey in a double-blind research framework is depicted in accordance with an illustrative embodiment. Process 700 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 700 can be implemented by data processing system 1600 in FIG. 16 and a processing unit such as processor unit 1604 in FIG. 16.

Process 700 starts. Process 700 links a double-blind framework application to an intra-network database (step 702). Process 700 provides a double-blind framework portal linked to the double-blind framework application (step 704). In response to a request entered on the double-blind framework portal, process 700 provides, to a requestor, responses to research surveys directed to an audience selected from the intra-network database based on an intra-change system (step 706). Process 700 ends thereafter. The double-blind framework application may be double-blind framework application 230 in FIG. 2. The intra-network database may comprise a database of entities and employees of the entities that have opted-in to an intra-change system. The intra-network database may be intra-network database 252 in FIG. 2 populated by intra-network application 246 in FIG. 2. The intra-change system may provide financial incentives to the entities and employees in the intra-network database by sharing a fee paid by the requestor for each research survey. The intra-change system may be intra-change application 236 in FIG. 2.

Turning to FIG. 8, a flowchart of a process for receiving criteria is depicted in accordance with an illustrative embodiment. Process 800 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 800 can be implemented by data processing system 1600 in FIG. 16 and a processing unit such as processor unit 1604 in FIG. 16.

Process 800 starts. Process 800 provides a research request page in a double-blind framework portal (step 802). Process 800 may use the double-blind framework application to provide the research request page. Process 800 provides, on the research request page, a number of criteria for selection (step 804). Process 800 ends. The number of criteria may comprise a number of questions, an audience size, geographic requirements, demographic requirements, employment requirements, and financial and asset requirements. The demographic requirements may comprise a country, a region, and an age range. The employment requirements may comprise an industry, a company size, an employment status, and a time in a current position. The financial and asset requirements may comprise a wage trend, an estimated monthly disposable income, an indication of home ownership, and an indication of home value. The research request page may be double-blind application portal 500 in FIG. 5 and double-blind application portal 600 in FIG. 6. The number of questions may be number of questions 520 in FIG. 5. The audience size may be audience size 522 in FIG. 5. The geographic requirements may be geographic requirements 526 in FIG. 5. The demographic requirements may be demographic requirements 528 in FIG. 5. The employment requirements may be employment requirements 620 in FIG. 6. The financial and asset requirements may be financial and asset requirements 640 in FIG. 6.

Turning to FIG. 9, a flowchart of a process for providing entity and individual opt-in to a double-blind framework application is depicted in accordance with an illustrative embodiment. Process 900 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 900 can be implemented by data processing system 1600 in FIG. 16 and a processing unit such as processor unit 1604 in FIG. 16.

Process 900 starts. Process 900 provides an entity opt-in page in a double-blind framework portal (step 902). Process 900 may use the double-blind framework application to provide the entity opt-in page. Process 900 provides an individual opt-in page in the double-blind framework portal (step 904). Process 900 ends. Process 900 may use the double-blind framework application to provide the individual opt-in page. The individual opt-in page may be provided by individual opt-in application 232 and the entity opt-in page by entity opt-in application 234 in FIG. 2.

Turning to FIG. 10, a flowchart of a process for adding an entity to a pool in an intra-network database is depicted in accordance with an illustrative embodiment. Process 1000 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1000 can be implemented by data processing system 1600 in FIG. 16 and a processing unit such as processor unit 1604 in FIG. 16.

Process 1000 starts. Process 1000, responsive to an individual selecting to opt-in to a double-blind framework application, adds the individual to a pool in an intra-network database (step 1002). Process 1000, responsive to an entity selecting to opt-in to the double-blind framework application, adds the entity to the pool in the intra-network database (step 1004). The pool may be intra-network database 252 in FIG. 2. The pool may be assembled by intra-network application 246 in conjunction with one more or more components of double-blind framework application 230 and data processing system 202 in FIG. 2. Process 1000 stops.

Figure 11:
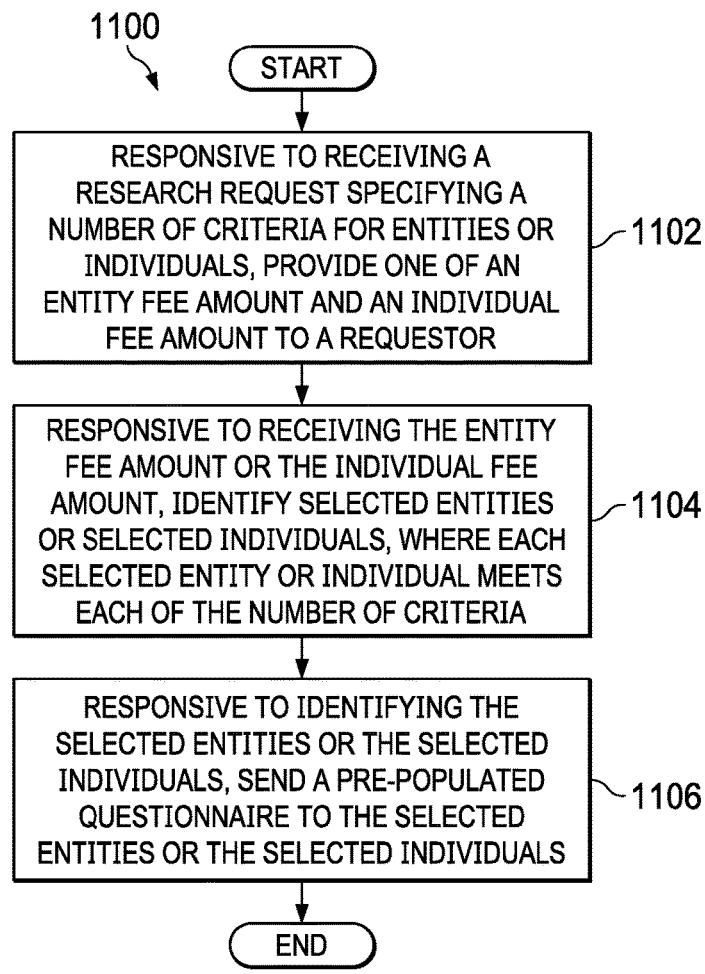
FIG. 11 is a flowchart of a process for sending a pre-populated research survey in accordance with an illustrative embodiment.

Turning to FIG. 11, a flowchart of a process for sending a pre-populated research survey is depicted in accordance with an illustrative embodiment. Process 1100 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1100 can be implemented by data processing system 1600 in FIG. 16 and a processing unit such as processor unit 1604 in FIG. 16.

Process 1100 starts. Process 1100, responsive to receiving a research request specifying a number of criteria for entities or individuals, provides one of an entity fee amount and an individual fee amount to a requestor (step 1102). Process 1100, responsive to receiving the entity fee amount or the individual fee amount, identifies selected entities or selected individuals (step 1104). Each selected entity or individual meets each of the number of criteria. Process 1100, responsive to identifying the selected entities or the selected individuals, sends a pre-populated questionnaire to the selected entities or the selected individuals (step 1106). The entity fee amount and the individual fee amount may be an amount such as estimated cost 514 in FIG. 5 and in FIG. 6. Process 1100 stops.

Figure 12:
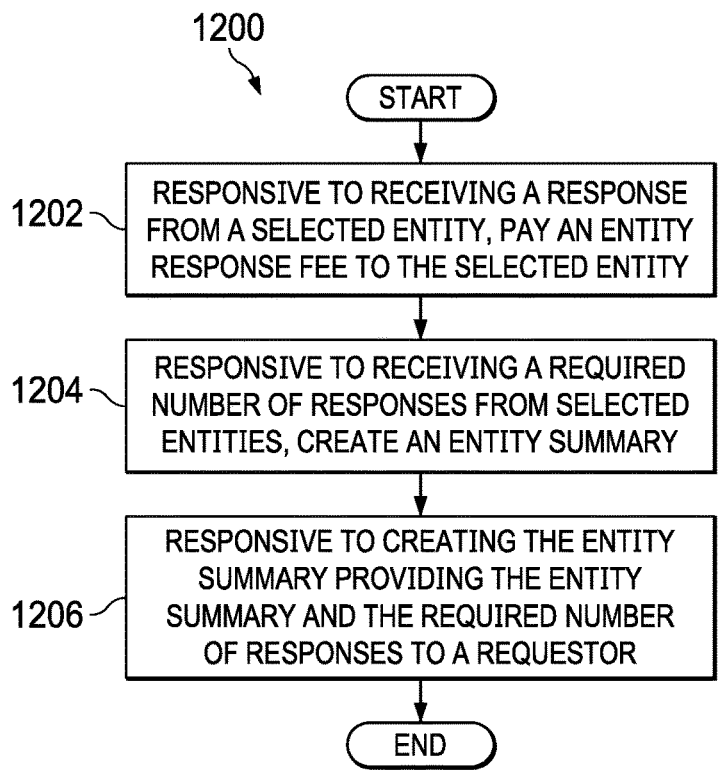
FIG. 12 is a flowchart of a process for providing an entity summary and responses in accordance with an illustrative embodiment.

Turning to FIG. 12, a flowchart of a process for providing an entity summary and responses is depicted in accordance with an illustrative embodiment. Process 1200 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1200 can be implemented by data processing system 1600 in FIG. 16 and a processing unit such as processor unit 1604 in FIG. 16.

Process 1200 starts. Process 1200, responsive to receiving a response from a selected entity, pays an entity response fee to the selected entity (step 1202). Process 1200, responsive to receiving a required number of responses from selected entities, creates an entity summary (step 1204). Process 1200, responsive to creating the entity summary, provides the entity summary and the required number of responses to a requestor (step 1206). The entity response fee may be made by intra-network payment application 240 in FIG. 2 in conjunction with other components of computer system 200 in FIG. 2. The entity summary may be prepared by collecting and analyzing application 244 in FIG. 2. The summary and the responses may be provided to the requestor by messaging application 242 in FIG. 2. Process 1200 stops.

Figure 13:
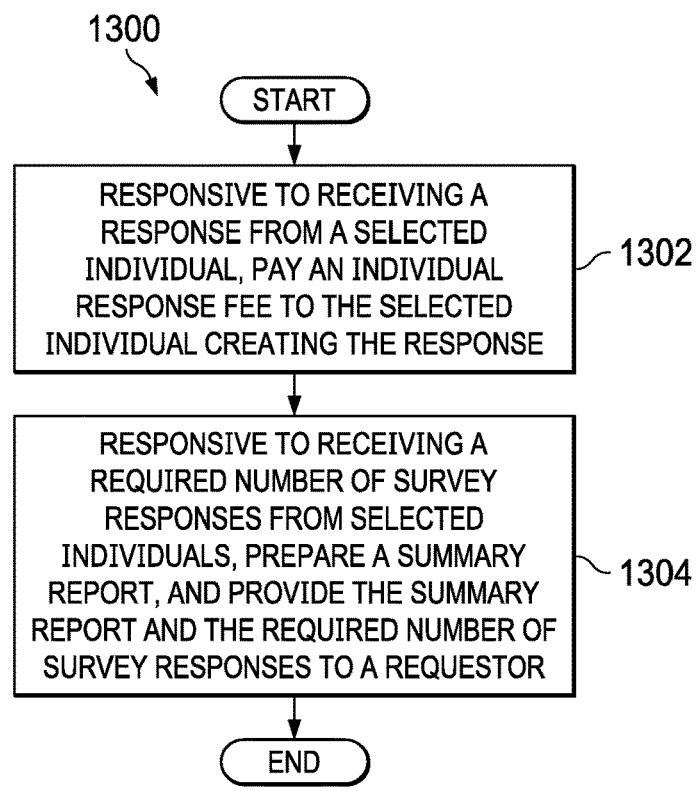
FIG. 13 is a flowchart of a process for paying an individual response fee and providing the response in accordance with an illustrative embodiment.

Turning to FIG. 13, a flowchart of a process for paying an individual response fee and providing a response is depicted in accordance with an illustrative embodiment. Process 1300 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1300 can be implemented by data processing system 1600 in FIG. 16 and a processing unit such as processor unit 1604 in FIG. 16.

Process 1300 starts. Process 1300, responsive to receiving a response from a selected individual, pays an individual response fee to the selected individual who created the response (step 1302). Process 1300, responsive to receiving a required number of survey responses from selected individuals, prepares a summary report, and provides the summary report and the required number of survey responses to a requestor (step 1304). The individual response fee may be made by intra-network payment application 240 in FIG. 2 in conjunction with other components of computer system 200 in FIG. 2. The individual summary may be prepared by collecting and analyzing application 244 in FIG. 2. The summary and the responses may be provided to the requestor by messaging application 242 in FIG. 2. Process 1300 stops.

Figure 14:
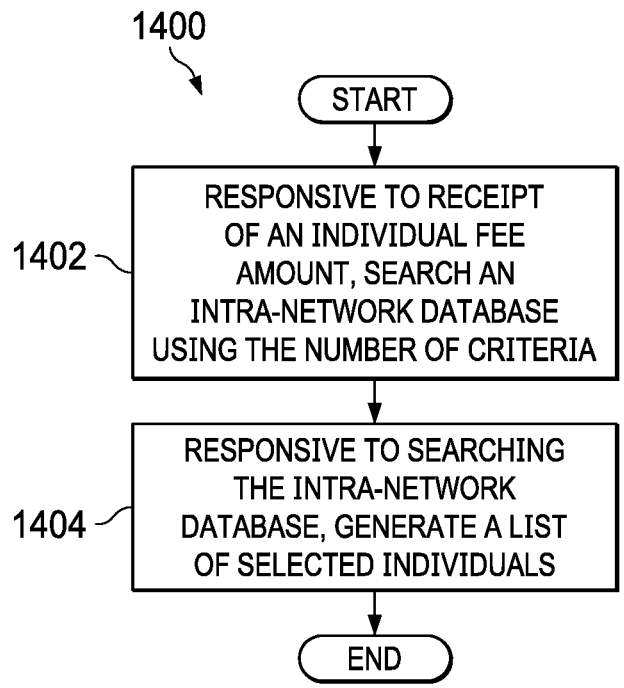
FIG. 14 is a flowchart of a process for generating a list of selected individuals in accordance with an illustrative embodiment.

Turning to FIG. 14, a flowchart of a process for generating a list of selected individuals is depicted in accordance with an illustrative embodiment. Process 1400 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1400 can be implemented by data processing system 1600 in FIG. 16 and a processing unit such as processor unit 1604 in FIG. 16.

Process 1400 starts. Process 1400, responsive to receipt of an individual fee amount, searches an intra-network database using a number of criteria (step 1402). Process 1400, responsive to searching the intra-network database, generates a list of selected individuals (step 1404). Each individual on the list of selected individuals meets the number of criteria. The search of the intra-network database may be performed by intra-network application 246 in FIG. 2. The intra-network database may be intra-network database 252 in FIG. 2. Process 1400 stops. The individual fee amount may be estimated cost 514 in FIG. 5 and FIG. 6. Process 1400 stops.

Figure 15:
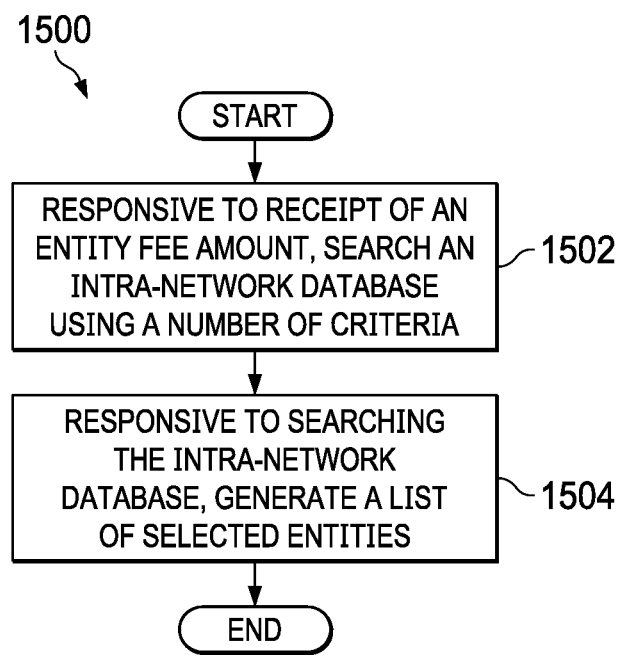
FIG. 15 is a flowchart of a process for generating a list of selected entities in accordance with an illustrative embodiment.
Figure 16:
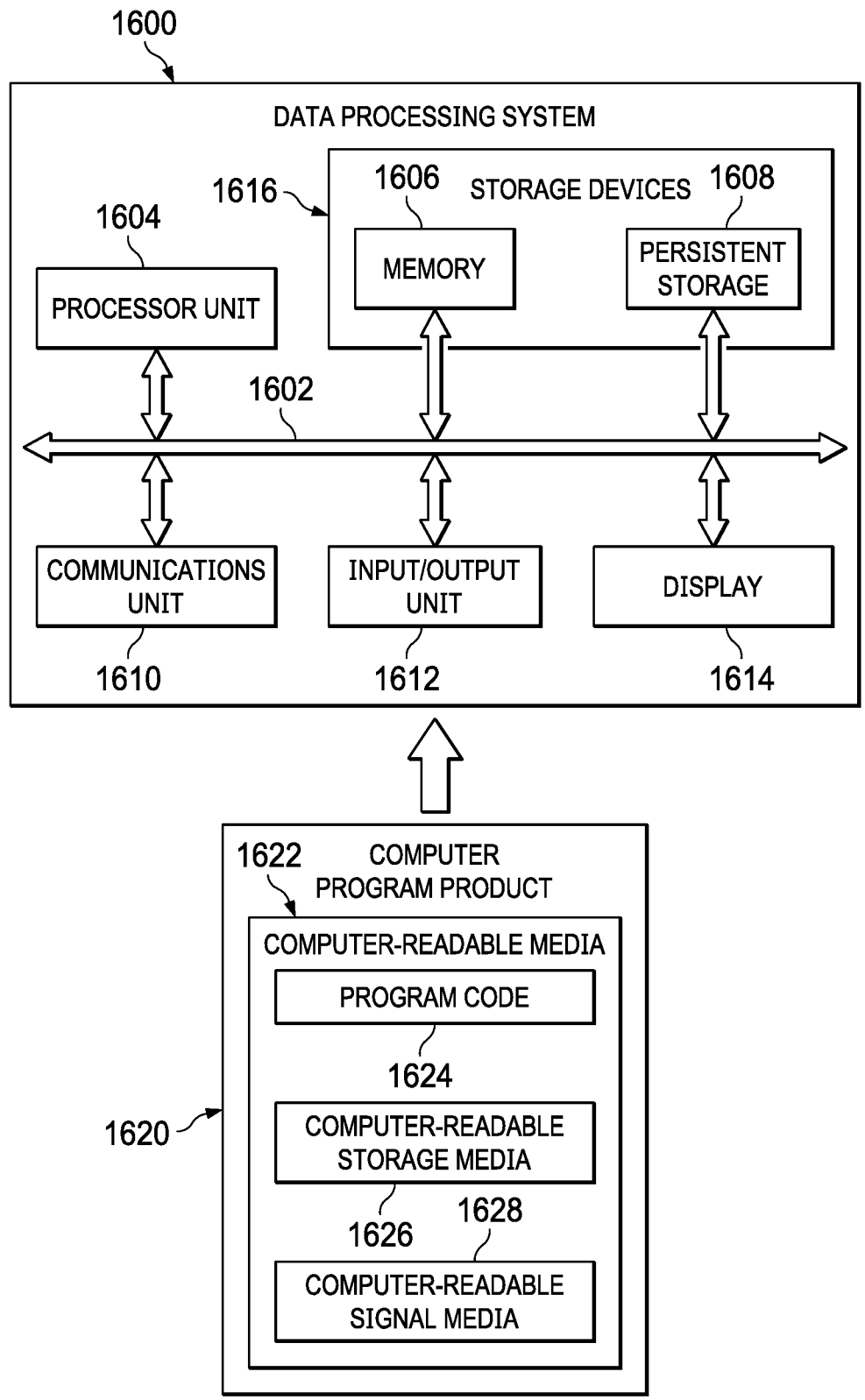
FIG. 16 is a block diagram of a data processing system depicted in accordance with an illustrative embodiment.

Turning to FIG. 15, a flowchart of a process for generating a list of selected entities is depicted in accordance with an illustrative embodiment. Process 1500 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, process 1500 can be implemented by data processing system 1600 in FIG. 16 and a processing unit such as processor unit 1604 in FIG. 16.

Process 1500 starts. Process 1500, responsive to receipt of an entity fee amount, searches an intra-network database using a number of criteria (step 1502). Process 1500, responsive to searching the intra-network database, generates a list of selected entities (step 1504). Each entity on the list of selected entities meets the number of criteria. The search of the intra-network database may be performed by intra-network application 246 in FIG. 2. The intra-network database may be intra-network database 252 in FIG. 2. The entity fee amount may be estimated cost amount 514 in FIG. 5 and FIG. 6. Process 1500 stops.

Turning now to FIG. 16, an illustration of a block diagram of a data processing system is depicted in accordance with an illustrative embodiment. Data processing system 1600 may be used to implement one or more computers and computer system 112 in FIG. 1. In this illustrative example, data processing system 1600 includes communications framework 1602, which provides communications between processor unit 1604, memory 1606, persistent storage 1608, communications unit 1610, input/output unit 1612, and display 1614. In this example, communications framework 1602 may take the form of a bus system.

Processor unit 1604 serves to execute instructions for software that may be loaded into memory 1606. Processor unit 1604 may be a number of processors, a multi-processor core, or some other type of processor, depending on the particular implementation. Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608. Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer-usable program code, or computer-readable program code that may be read and executed by a processor in processor unit 1604. The program code in the different embodiments may be embodied on different physical or computer-readable storage media, such as memory 1606 or persistent storage 1608.

Program code 1624 is located in a functional form on computer-readable media 1622 that is selectively removable and may be loaded onto or transferred to data processing system 1600 for execution by processor unit 1604. Program code 1624 and computer-readable media 1622 form computer program product 1620 in these illustrative examples. In one example, computer-readable media 1622 may be computer-readable storage media 1626 or computer-readable signal media 1628.

In these illustrative examples, computer-readable storage media 1626 is a physical or tangible storage device used to store program code 1624 rather than a medium that propagates or transmits program code 1624. Alternatively, program code 1624 may be transferred to data processing system 1600 using computer-readable signal media 1628.

Computer-readable signal media 1628 may be, for example, a propagated data signal containing program code 1624. For example, computer-readable signal media 1628 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1624.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for research in a double-blind framework, the computer-implemented method comprising:

linking, by a data processing system, a double-blind framework application to an intra-network database, wherein the double-blind framework application is communicatively coupled to the intra-network database, wherein the intra-network database is populated by an intra-network application with information regarding one or more entities and information regarding employees of the one or more entities, wherein information regarding employees is retrieved from one or more payroll databases maintained by a payroll service provided by a payroll company to the one or more entities;

providing, by the data processing system, a double-blind framework portal linked to the double-blind framework application;

providing, by the double-blind framework application, a research request page in the double-blind framework portal;

providing, by the double-blind framework application, on the research request page, a number of criteria for selection;

receiving, by the double-blind framework application, user input from the research request page, the user input indicating one or more selected criteria selected from the number of criteria for selection; and responsive to a request entered on the double-blind framework portal, providing to a requestor, by the data processing system, responses to research surveys directed to an audience selected from the intra-network database based on an intra-change system;

wherein the intra-network database comprises a database storing information regarding the one or more entities and employees of the one or more entities, wherein the one or more entities and the employees of the one or more entities have opted-in to the intra-change system;

responsive to receiving a research request specifying one or more selected criteria for the entities or individuals, providing one of an entity fee amount and an individual fee amount;

responsive to receiving the entity fee amount or the individual fee amount, identifying, in the intra-network database, selected entities or selected individuals that are employees of the one or more entities, where each selected entity or selected individual meets each of the one or more selected criteria;

responsive to identifying the selected entities or the selected individuals, sending a pre-populated questionnaire to the selected entities or the selected individuals; and wherein the intra-change system provides financial incentives to the entities and the employees by sharing a fee paid by the requestor for each research survey in which the one or more entities and employees participate.

2. The computer-implemented method of claim 1, wherein the number of criteria for selection on the research request page comprises a number of questions, an audience size, demographic requirements, employment requirements;

and financial and asset requirements;

wherein the demographic requirements comprise a country, a region, and an age range;

wherein the employment requirements comprise an industry, a company size, an employment status, and a time in a current position; and wherein the financial and asset requirements comprise a wage trend, an estimated monthly disposable income, an indication of home ownership, and an indication of home value.

3. The method of claim 1, further comprising:
providing, by the double-blind framework application, an entity opt-in page in the double-blind framework portal; and
providing, by the double-blind framework application, an individual opt-in page in the double-blind framework portal.

4. The method of claim 3, further comprising:
responsive to an individual selecting to opt-in to the double-blind framework application, adding the individual to a pool in the intra-network database; and
responsive to an entity selecting to opt-in to the double-blind framework application, adding the entity to the pool in the intra-network database.

5. The method of claim 1, further comprising:
responsive to receiving a response from a selected entity, paying an entity response fee to the selected entity;
responsive to receiving a required number of responses from the selected entities, creating an entity summary; and
responsive to creating the entity summary providing the entity summary and the required number of responses to the requestor.

6. The method of claim 1, further comprising:
responsive to receiving a response from a selected individual, paying an individual response fee to the selected individual who created the response; and
responsive to receiving a required number of survey responses from the selected individuals, preparing a summary report, and providing the summary report and the required number of responses to the requestor.

7. The method of claim 1, further comprising:
responsive to a receipt of the individual fee amount, searching the intra-network database using the one or more selected criteria; and
responsive to searching the intra-network database, generating a list of selected individuals;
wherein each individual on the list of selected individuals meets the one or more selected criteria.

8. The method of claim 1, further comprising:
responsive to a receipt of the entity fee amount, searching the intra-network database using the one or more selected; and
responsive to searching the intra-network database, generating a list of selected entities;
wherein each entity on the list of selected entities meets the one or more selected.

9. A system for research in a double-blind framework, the system comprising:
a data processing system, having a processor unit, connected to a network and an intra-network database; and
a double-blind framework application stored on a computer-readable storage medium and configured to cause the processor unit to link the double-blind framework application to the intra-network database, to provide a double-blind framework portal linked to the double-blind framework application, and responsive to a request entered on the double-blind framework portal, to provide to a requestor responses to research surveys directed to an audience selected from the intra-network database based on an intra-change system;
wherein the intra-network database comprises a database storing information regarding one or more entities and employees of the one or more entities, wherein the one or more entities and the employees of the one or more entities have opted-in to the intra-change system;
wherein the intra-change system provides financial incentives to the entities and employees by sharing a fee paid by the requestor for each research survey;
wherein the double-blind framework application is communicatively coupled to the intra-network database, wherein the intra-network database is populated by an intra-network application with information regarding one or more entities and information regarding employees of the one or more entities, wherein information regarding employees is retrieved from one or more payroll databases maintained by a payroll service provided by a payroll company to the one or more entities;
wherein the double-blind framework application stored on the computer-readable storage medium is further configured to cause the processor unit,
to provide a research request page in the double-blind framework portal;
to provide, on the research request page, a number of criteria for selection;
to receive user input from the research request page, the user input indicating one or more selected criteria selected from the number of criteria for selection; and
responsive to receiving a research request specifying one or more selected criteria for the entities or the individuals, to provide one of an entity fee amount and an individual fee amount;
wherein the double-blind framework application stored on the computer-readable storage medium is further configured to cause the processor unit, responsive to receiving the entity fee amount or the individual fee amount, to identify selected entities or selected individuals that are employees of the one or more entities, where each selected entity or selected individual meets each of the one or more selected criteria; and
wherein the double-blind framework application stored on the computer-readable storage medium is further configured to cause the processor unit, responsive to identifying the selected entities or the selected individuals, to send a pre-populated questionnaire to the selected entities or the selected individuals.

10. The system of claim 9,
wherein the number of criteria for selection on the research request page comprises a number of questions, an audience size, demographic requirements, employment requirements, and financial and asset requirements;
wherein the demographic requirements comprise a country, a region, and an age range;
wherein the employment requirements comprise an industry, a company size, an employment status, and a time in a current position; and
wherein the financial and asset requirements comprise a wage trend, an estimated monthly disposable income, an indication of home ownership, and an indication of home value.

11. The system of claim 9, wherein the double-blind framework application, stored on the computer-readable storage medium, is further configured to cause the processor unit of the data processing system to provide an entity opt-in page in the double-blind framework portal; and to provide an individual opt-in page in the double-blind framework portal.

12. The system of claim 11, wherein the double-blind framework application, stored on the computer-readable storage medium, is further configured to cause the processor unit of the data processing system, responsive to an individual selecting to opt-in to the double-blind framework application; to add the individual to a pool in the intra-network database; and responsive to an entity selecting to opt-in to the double-blind framework application, to add the entity to a pool in the intra-network database.

13. The system of claim 11, wherein the double-blind framework application stored on the computer-readable storage medium is further configured to cause the processor unit of the data processing system, responsive to receiving a response from a selected entity, to pay an entity response fee to the selected entity; responsive to receiving a required number of responses from selected entities, to create an entity summary; and responsive to creating the entity summary, to provide the entity summary and the required number of responses to the requestor.

14. The system of claim 11, wherein the double-blind framework application, stored on the computer-readable storage medium, is further configured to cause a processor unit of the data processing system, responsive to receipt of an entity fee amount, to search the intra-network database using the one or more selected criteria; responsive to searching the intra-network database, to generate a list of selected entities, wherein each entity on the list of selected entities meets the one or more selected criteria.

15. A computer program product for research in a double-blind framework, the computer program product comprising:
  computer program instructions stored in a computer-readable storage medium and configured to cause a processor unit to link a double-blind framework application to an intra-network database;
  computer program instructions stored in the computer-readable storage medium and configured to cause the processor unit to provide a double-blind framework portal linked to the double-blind framework application;
  computer program instructions stored in the computer-readable storage medium and configured to cause the processor unit to, responsive to a request being entered on the double-blind framework portal, to provide to a requestor responses to research surveys directed to an audience selected from the intra-network database based on an intra-change system;
  computer program instructions stored in the computer-readable storage medium and configured to cause the processor unit to provide a research request page in the double-blind framework portal;
  computer program instructions stored in the computer-readable storage medium and configured cause the processor unit to provide, on the research request page, a number of criteria for selection;
  computer program instructions stored in the computer-readable storage medium and configured cause the processor unit to receive user input from the research request page, the user input indicating one or more selected criteria selected from the number of criteria for selection on the research request page; and
  computer program instructions stored in the computer-readable storage medium and configured to cause the processor unit to, responsive to receiving a research request specifying the one or more selected criteria for one or more entities or individuals, provide one of an entity fee amount and an individual fee amount;
  computer program instructions stored in the computer-readable storage medium and configured to cause the processor unit to, responsive to receiving the entity fee amount or the individual fee amount, identify selected entities or selected individuals that are employees of the one or more entities, where each selected entity or selected individual meets each of the one or more selected criteria;
  computer program instructions stored in the computer-readable storage medium and configured to cause the processor unit to, responsive to identifying the selected entities or the selected individuals, send a pre-populated questionnaire to the selected entities or the selected individuals;
  wherein the double-blind framework application is communicatively coupled to the intra-network database, wherein the intra-network database is populated by an intra-network application with information regarding one or more entities and information regarding employees of the one or more entities, wherein information regarding employees is retrieved from one or more payroll databases maintained by a payroll service provided by a payroll company to the one or more entities;
  wherein the intra-network database comprises a database of entities and employees of the entities that have opted-in to the intra-change system; and
  wherein the intra-change system provides financial incentives to the entities and the employees by sharing a fee paid by the requestor for each research survey.

16. The computer program product of claim 15, wherein the number of criteria for selection on the research request page comprises a number of questions, an audience size, demographic requirements, employment requirements, financial and asset requirements; wherein the demographic requirements comprise a country, a region, and an age range; wherein the employment requirements comprise an industry, a company size, an employment status, and a time in current position; wherein the financial and asset requirements comprise a wage trend, an estimated monthly disposable income, an indication of home ownership, and an indication of home value.

17. The computer program product of claim 15, further comprising:
  computer program instructions stored in the computer-readable storage medium and configured to cause the processor unit to provide an entity opt-in page in the double-blind framework portal; and
  computer program instructions stored in the computer-readable storage medium and configured to cause the processor unit to provide an individual opt-in page in the double-blind framework portal.

18. The computer program product of claim 15, further comprising:
  computer program instructions stored in the computer-readable storage medium and configured to cause the processor unit, responsive to an individual selecting to opt-in to the double-blind framework application, to add the individual to a pool in the intra-network database; and
  computer program instructions stored in the computer-readable storage medium and configured to cause the processor unit, responsive to an entity selecting to opt-in to the double-blind framework application, to add the entity to the pool in the intra-network database.

19. The computer program product of claim 15, further comprising:
  computer program instructions stored in the computer-readable storage medium and configured to cause the processor unit, responsive to a receipt of an entity fee amount, to search the intra-network database using the one or more selected criteria; and computer program instructions stored in the computer-readable storage medium and configured to cause the processor unit to generate a list of selected entities, wherein each entity on the list of selected entities meets the one or more selected criteria.

20. The computer program product of claim 15, further comprising:

computer program instructions stored in the computer-readable storage medium and configured to cause the processor unit, responsive to receiving a response from a selected entity, to pay an entity response fee to the selected entity; and computer program instructions stored in the computer-readable storage medium and configured to cause the processor unit, responsive to receiving a response from a selected individual, to pay an individual response fee to the selected individual who created the response.

* * * * *